United States Patent
Aoyama et al.

(10) Patent No.: US 12,221,142 B2
(45) Date of Patent: Feb. 11, 2025

(54) WIRELESS RELAY DEVICE, AND MEMORY TO STORE PROGRAM FOR CONTROLLING WIRELESS RELAY DEVICE

(71) Applicant: MITSUBISHI ELECTRIC CORPORATION, Tokyo (JP)

(72) Inventors: Tetsuya Aoyama, Tokyo (JP); Yuji Miyake, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 899 days.

(21) Appl. No.: 17/360,506

(22) Filed: Jun. 28, 2021

(65) Prior Publication Data
US 2021/0323593 A1    Oct. 21, 2021

Related U.S. Application Data

(63) Continuation of application No. PCT/JP2019/001489, filed on Jan. 18, 2019.

(51) Int. Cl.
*B61L 27/70* (2022.01)
*B61L 15/00* (2006.01)
(Continued)

(52) U.S. Cl.
CPC .......... *B61L 27/70* (2022.01); *B61L 15/0018* (2013.01); *B61L 15/0027* (2013.01); *H04B 7/155* (2013.01); *B61L 25/021* (2013.01)

(58) Field of Classification Search
CPC .... B61L 15/0027; B61L 25/021; B61L 27/70; H04B 7/155
See application file for complete search history.

(56) References Cited

U.S. PATENT DOCUMENTS

| 2014/0161022 A1 | 6/2014 | Yamaguchi et al. |
| 2018/0334179 A1 | 11/2018 | Aoyama et al. |
| 2020/0114941 A1 | 4/2020 | Nakamura et al. |

FOREIGN PATENT DOCUMENTS

| CN | 107423824 A * 12/2017 ............. G06Q 10/20 |
| JP | 7-177176 A    7/1995 |

(Continued)

OTHER PUBLICATIONS

International Search Report (PCT/ISA/210) issued in PCT/JP2019/001489, mailed on Mar. 19, 2019.
(Continued)

*Primary Examiner* — Hung Q Nguyen
*Assistant Examiner* — Mark L. Greene
(74) *Attorney, Agent, or Firm* — Birch, Stewart, Kolasch & Birch, LLP

(57) ABSTRACT

The wireless relay device according to the present disclosure includes: a reception unit to receive train control information; an information classification unit to classify the train control information into first control information requiring immediacy and second control information not requiring immediacy; a message generation unit to generate one message from the first control information contained in a piece of the train control information and to generate one message from a plurality of pieces of the second control information contained in a plurality of pieces of the train control information; and a transmission unit to transmit the messages generated by the message generation unit. With this configuration, it is possible to reduce the number of the data transfer messages which does not require immediacy while the instantaneous communication for the control information which requires immediacy is maintained.

11 Claims, 16 Drawing Sheets

(51) Int. Cl.
*H04B 7/155* (2006.01)
*B61L 25/02* (2006.01)

(56) References Cited

FOREIGN PATENT DOCUMENTS

JP       2002-12150 A     1/2002
JP       2018-197051 A    12/2018

OTHER PUBLICATIONS

Chinese Office Action and Search Report for Chinese Application No. 201980088690.1, dated Sep. 15, 2022, with an English translation of the Chinese Office Action.
Extended European Search Report for European Application No. 19910277.3, dated Nov. 29, 2021.
European Communication pursuant to Article 94(3) EPC for European Application No. 19910277.3, dated Aug. 11, 2022.
Chinese Office Action for Chinese Application No. 201980088690.1, dated Mar. 27, 2023 with English machine translation.
European Office Action for European Application No. 19 910 277.3, dated Dec. 14, 2022.

* cited by examiner

FIG. 10

| Destination train ID | ID of ground wireless device in communication |
|---|---|
| 200 | 100 |
| 210 | 120 |
| ... | ... |

FIG. 11

| ID of ground wireless device | Direction of travel | Destination ground wireless device ID for advance transmission |
|---|---|---|
| 100 | Direction A | 110, 120 |
| 120 | Direction A | 130, 140 |
| ... | ... | ... |

FIG. 16

| Time slot | Wireless relay device |
|---|---|
| 0 | 410, 420, 430, 440 |
| 1 | — |
| 2 | 430, 440 |
| 3 | 420, 440 |
| 4 | 430, 440 |
| 5 | — |

WIRELESS RELAY DEVICE, AND MEMORY TO STORE PROGRAM FOR CONTROLLING WIRELESS RELAY DEVICE

TECHNICAL FIELD

The present disclosure relates to a wireless relay device which relays data wirelessly.

BACKGROUND ART

A wireless train control system in which wireless communication is performed between ground wireless devices installed along a railway track and on-board wireless devices installed on trains, and operation control and speed control for a train are performed based on information transmitted by the wireless communication is attracting attention. The wireless train control system has an advantage in terms of the installation cost and the maintenance cost because it does not require track circuits as compared to a train operation control method using conventional fixed block sections. Further, in the wireless train control system, it is possible to construct flexible block sections that is not limited to fixed sections. This makes it possible to increase the operation density of trains, which also leads to an advantage in terms of the operating cost.

If each of the ground wireless devices is connected to base equipment installed in an equipment room etc. via a wired line, installation or relocation of a ground wireless device requires laying or relocation of the wired line. Therefore, instead of the wired lines for connecting the ground wireless devices, by using wireless lines which connect or relay between the ground wireless devices, the degree of freedom of installation and relocation of the ground wireless devices can be improved.

Patent document 1 discloses a wireless communication network system which does not require communication cables connecting between wireless devices along the railway track by allowing adjacent wireless devices to sequentially communicate wirelessly with each other. Since transmission speed of the wireless line is generally slower than that of the wired line, some method for improving the transmission efficiency may be adopted when the wired lines are replaced with the wireless lines. Patent document 2 discloses, as a control method of packet transmission, a method of combining transmission packets within the limitation of the combined packet length to transmit the packet as one packet to the transmission path.

The wireless train control system not only transmits to the ground wireless device currently in communication with the on-board wireless device of a train, train control information generated by the base equipment and addressed to on-board control devices of trains, but also transmits the copies of the train control information in advance to a plurality of ground wireless devices corresponding to destinations of the trains. Therefore, the number of packets carrying the train control information transmitted between the ground wireless devices is n times of the number of the on-board wireless devices (n is the number of advance transmissions).

CITATION LIST

Patent Document

Patent Document 1: Japanese Patent Application Laid-Open No. 2002-12150

Patent Document 2: Japanese Patent Laid-Open No. 1107-177176

SUMMARY OF INVENTION

Problems to be Solved by Invention

In the prior art disclosed in Patent Document 1, the time slots for each wireless device to perform transmission are pre-allocated in the time division multiple access method. However, with a limited wireless bandwidth available, if the train control information packets increased to n times in number are transferred over the wireless line, the wireless bandwidth runs short, which consequently limits the manageable number of the trains.

In the prior art disclosed in Patent Document 2, a plurality of packets is combined into one packet in accordance with the packet lengths, so that the number of packets is reduced. In order to combine the plurality of packets into one packet, however, it is necessary to hold packets for a certain period of time before the transmission. This means that the transfer to the ground wireless device currently in communication with a train may be suspended, resulting in a delay in the transmission of the train control information to the train.

The present disclosure has been made to solve the above problems, and an object is to provide a wireless relay device capable of securing a wireless capacity between wireless relay devices by reducing the number of messages of train control information that does not require immediacy when wireless relay is performed between wireless relay devices while immediacy communication of train control information that requires immediacy is maintained.

Means for Solving Problems

The wireless relay device according to the present disclosure includes: a reception unit to receive train control information; an information classification unit to classify the train control information into first control information requiring immediacy and second control information not requiring immediacy; a message generation unit to generate one message from the first control information contained in a piece of the train control information and to generate one message from a plurality of pieces of the second control information contained in a plurality of pieces of the train control information; and a transmission unit to transmit the message generated by the message generation unit.

Effect of Invention

According to the present disclosure, it is possible to reduce the number of data transfer messages which do not require immediacy, while the instantaneous communication of the control information which requires immediacy is maintained.

BRIEF DESCRIPTION OF DRAWINGS

FIG. 10 is an example of a communication path table according to Embodiment 1.

FIG. 11 is an example of a communication reservation table according to Embodiment 1.

FIG. 16 is a transmission timing setting table of a wireless relay device 400 according to Embodiment 3.

MODES FOR CARRYING OUT INVENTION

Embodiment 1

Hereinafter, embodiments of the present disclosure will be described.

Figure 1:
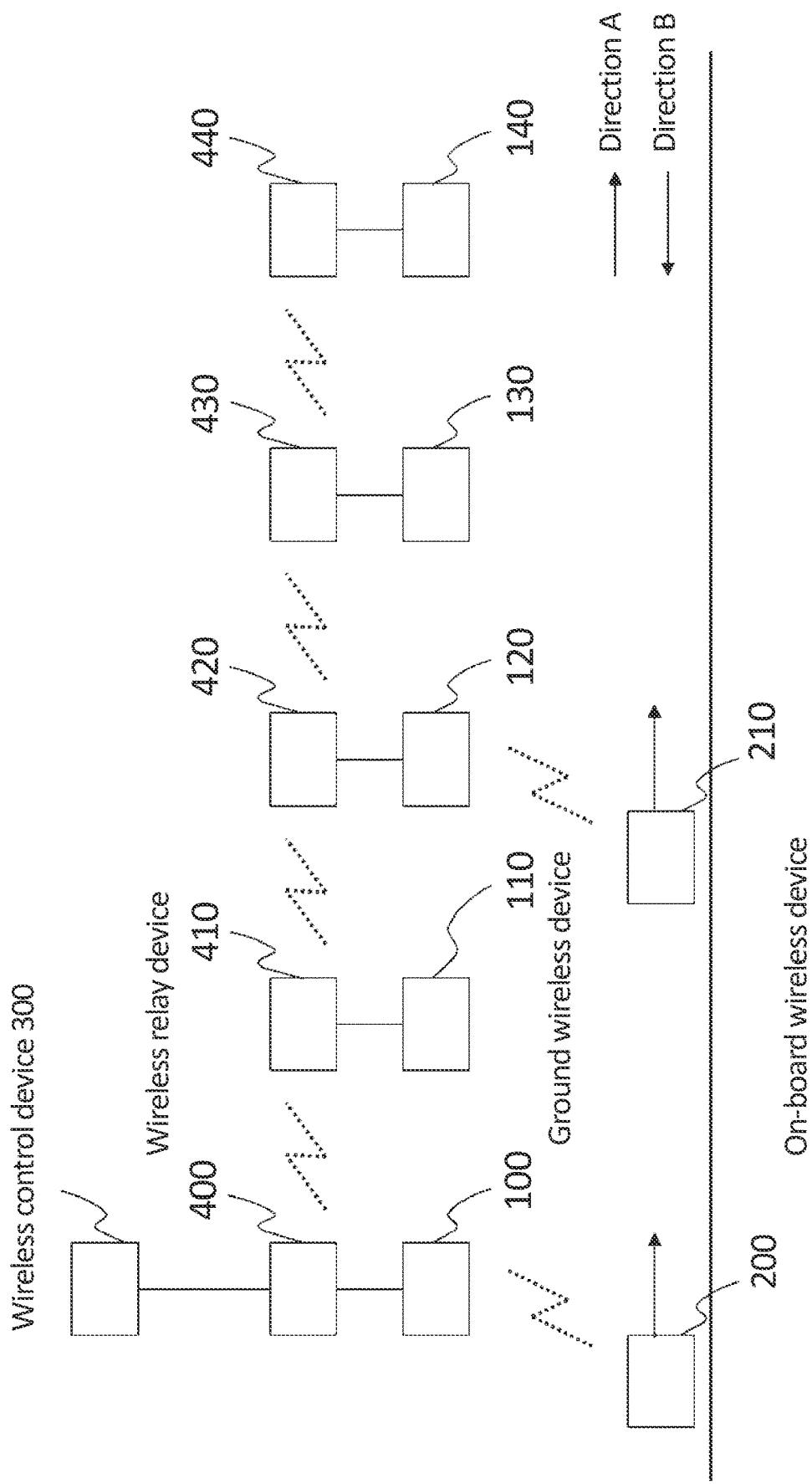
FIG. 1 is a configuration of a wireless train control system according to Embodiment 1.

FIG. 1 shows a configuration of a wireless train control system. In each of the following figures, the same symbols indicate the same or equivalent parts. Ground wireless devices 100 to 140 are installed along a railway track. On-board wireless devices 200 and 210 that are each installed on a train continue to communicate with one of the ground wireless devices 100 to 140 depending on their locations on the railway track while moving along the railway track. A wireless control device 300 is installed, for example, in an equipment room and is connected to one of the ground wireless devices, to manage transmission destinations of information transmitted between the ground and a train. For example, in the case where the on-board wireless device 200 is connected to the ground wireless device 100 and moves toward the ground wireless device 110 in future (Direction A), the wireless control device 300 duplicates and transmits train control information to a plurality of ground wireless devices corresponding to the destinations of the train, the plurality of ground wireless devices being the ground wireless device 110 and the ground wireless device 120. The wireless relay device 400 is connected to the ground wireless device 100 and the data is relayed between the wireless relay devices 400 to 440, so that the wireless control device 300 and the ground wireless devices 110 to 140 can communicate with each other.

The information transmitted between the ground wireless device 100 and the on-board wireless device 200 may include general transmission information, not to mention the train control information. The train control information is information used for controlling train travel such as brake command information, and in addition, train travel position information, speed information, train travel permission location information, and speed limit information can be exemplified. General transmission information is information that is not included in the train control information, such as air conditioning temperature information, in-train display information, and surveillance camera image information.

Figure 2:
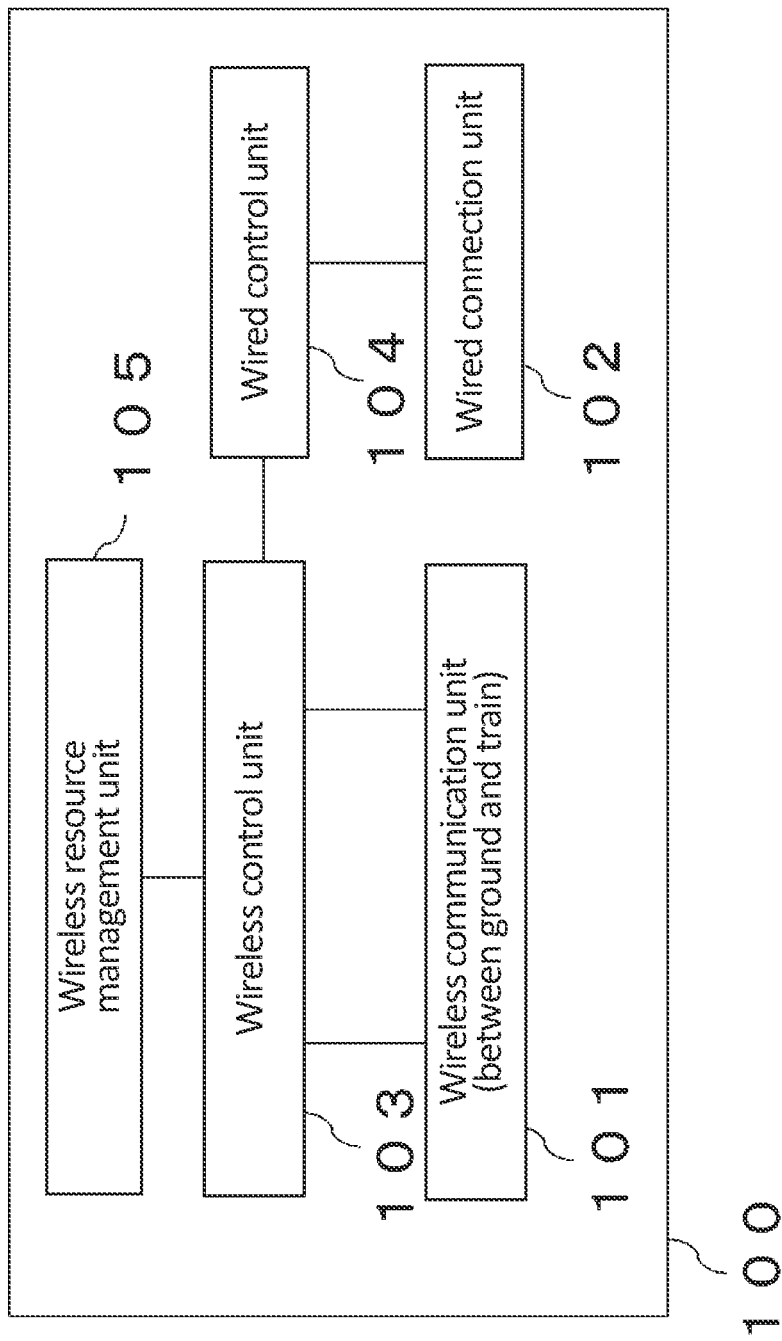
FIG. 2 is a functional configuration of a ground wireless device 100 according to Embodiment 1.

FIG. 2 shows a functional configuration of the ground wireless device 100. The ground wireless device 100 includes: a wireless communication unit (between ground and train) 101; a wired connection unit 102; a wireless control unit 103 which controls a wireless line; a wired control unit 104 which controls a wired line; and a wireless resource management unit 105 which manages wireless resources. The ground wireless devices 110 to 140 have the same functional configuration.

Figure 3:
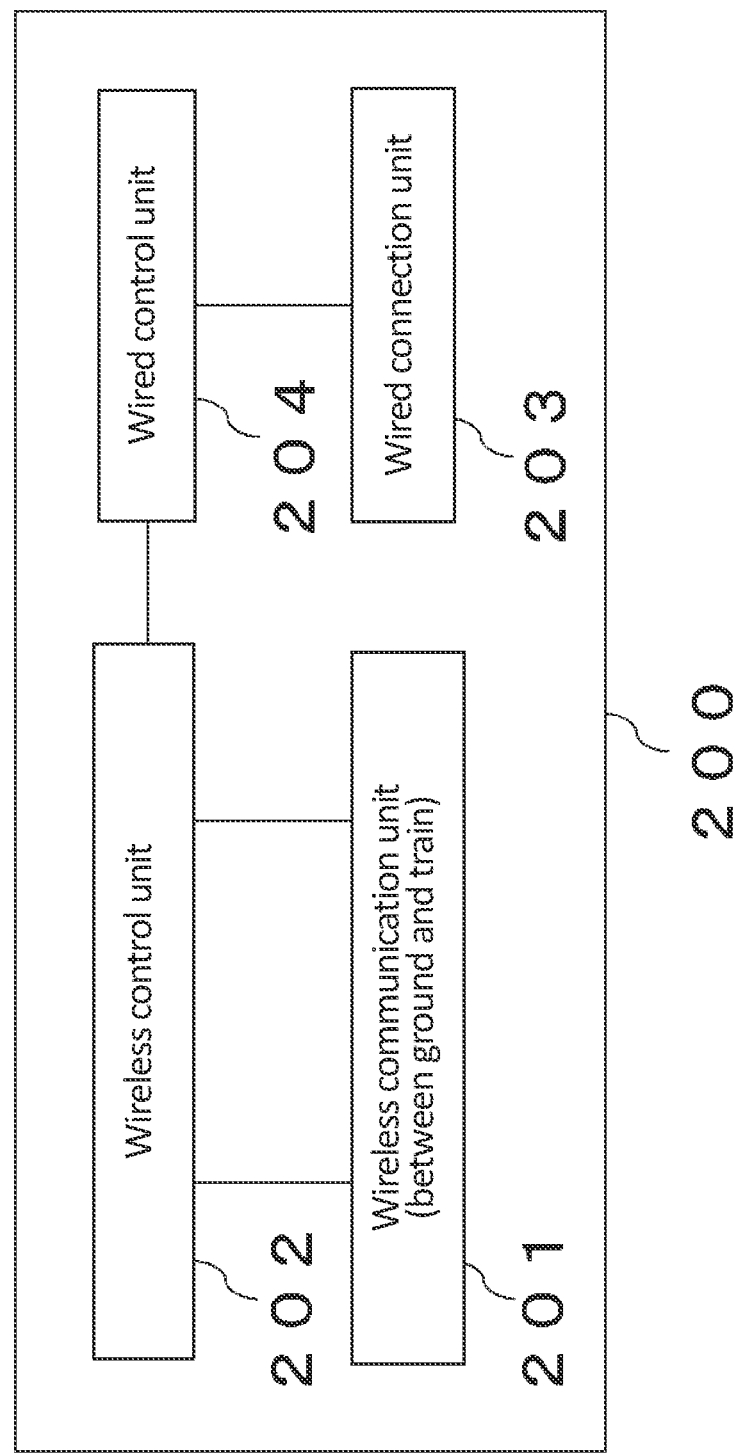
FIG. 3 is a functional configuration of an on-board wireless device according to Embodiment 1.
Figure 4:
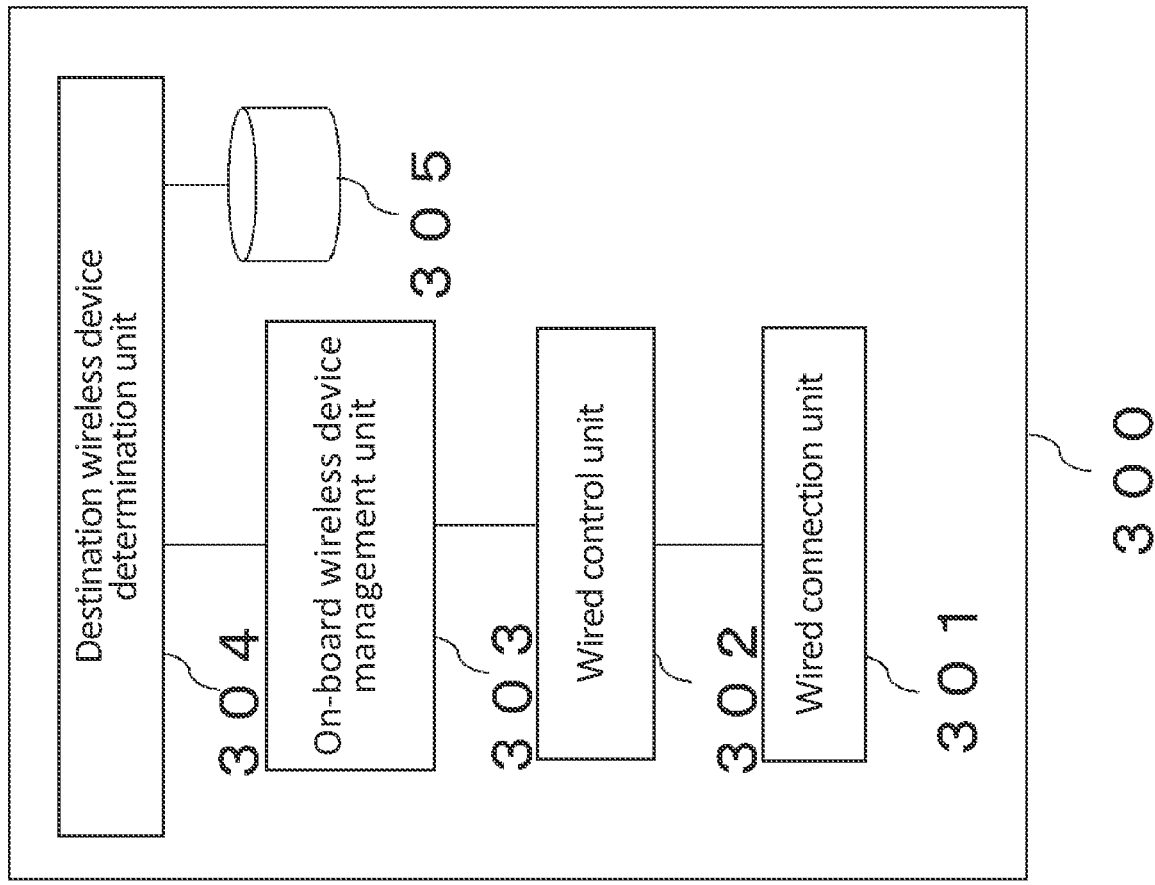
FIG. 4 is a functional configuration of a wireless control device 300 according to Embodiment 1.

FIG. 3 shows a functional configuration of the on-board wireless device 200. The on-board wireless device 200 includes: a wireless communication unit (between ground and train) 201; a wireless control unit 202 which controls a wireless line; a wired connection unit 203 for connecting to other devices on the train; and a wired control unit 204 which controls a wired line. FIG. 4 shows a functional configuration of the wireless control device 300. The wireless control device 300 includes: a wired connection unit 301; a wired control unit 302; an on-board wireless device management unit 303 which manages the communication state of the on-board wireless device; a destination wireless device determination unit 304 which determines ground wireless devices corresponding to the movement of the on-board wireless device; a communication path table; and a database unit 305 with a communication reservation table.

Figure 5:
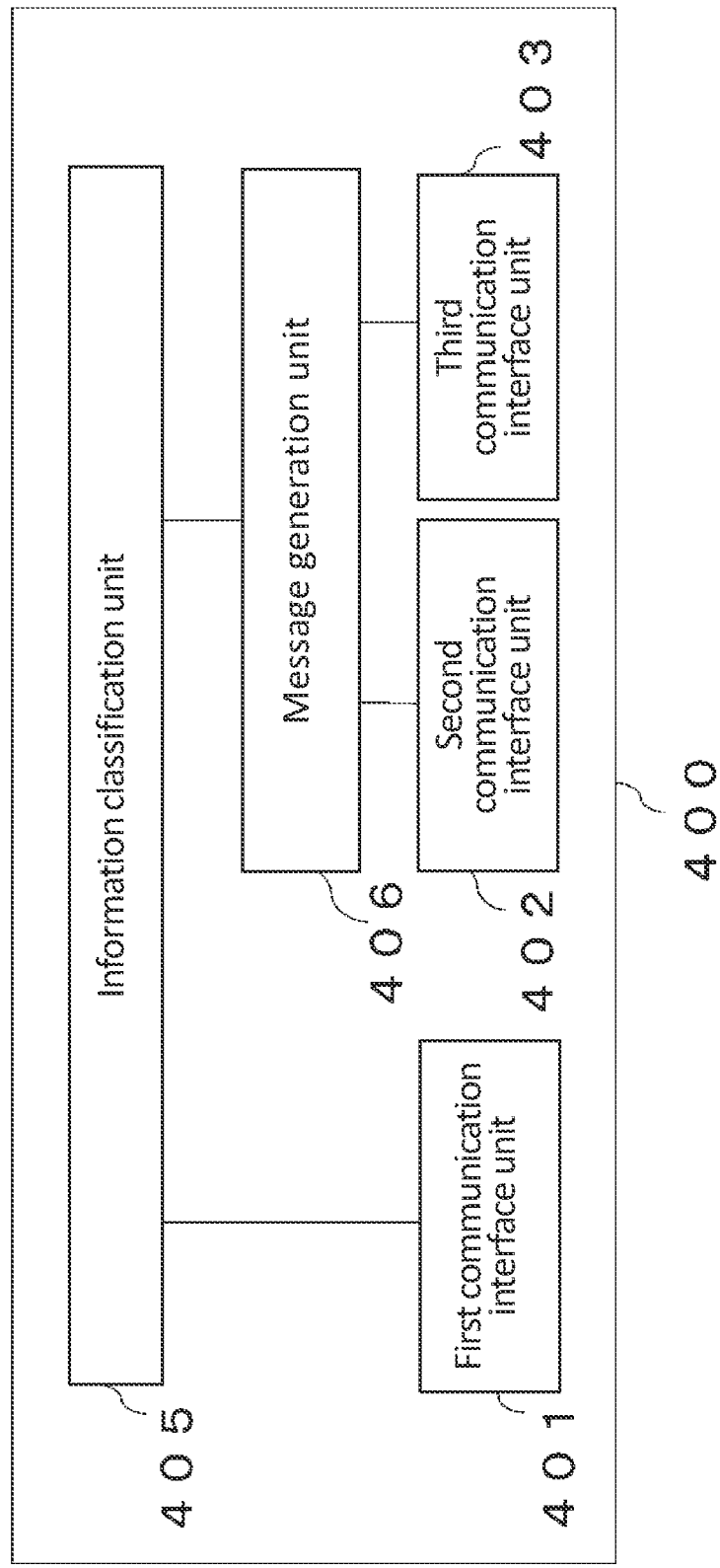
FIG. 5 is a functional configuration of a wireless relay device 400 according to Embodiment 1.

FIG. 5 shows a functional configuration of the wireless relay device 400. The wireless relay device 400 includes: a first communication interface unit 401 which connects to the wireless control device or an upstream wireless relay device; a second communication interface unit 402 which connects to a ground wireless device; a third communication interface unit 403 which connects to a downstream wireless relay device; an information classification unit 405 which analyzes packets received from the first communication interface unit 401, divides the combined packets, and classifies the divided packets based on the analysis result; and a message generation unit 406 which combines the packets held during a predetermined period of time and generates transmission packets for a device under the control of the wireless relay device 400.

Figure 6:
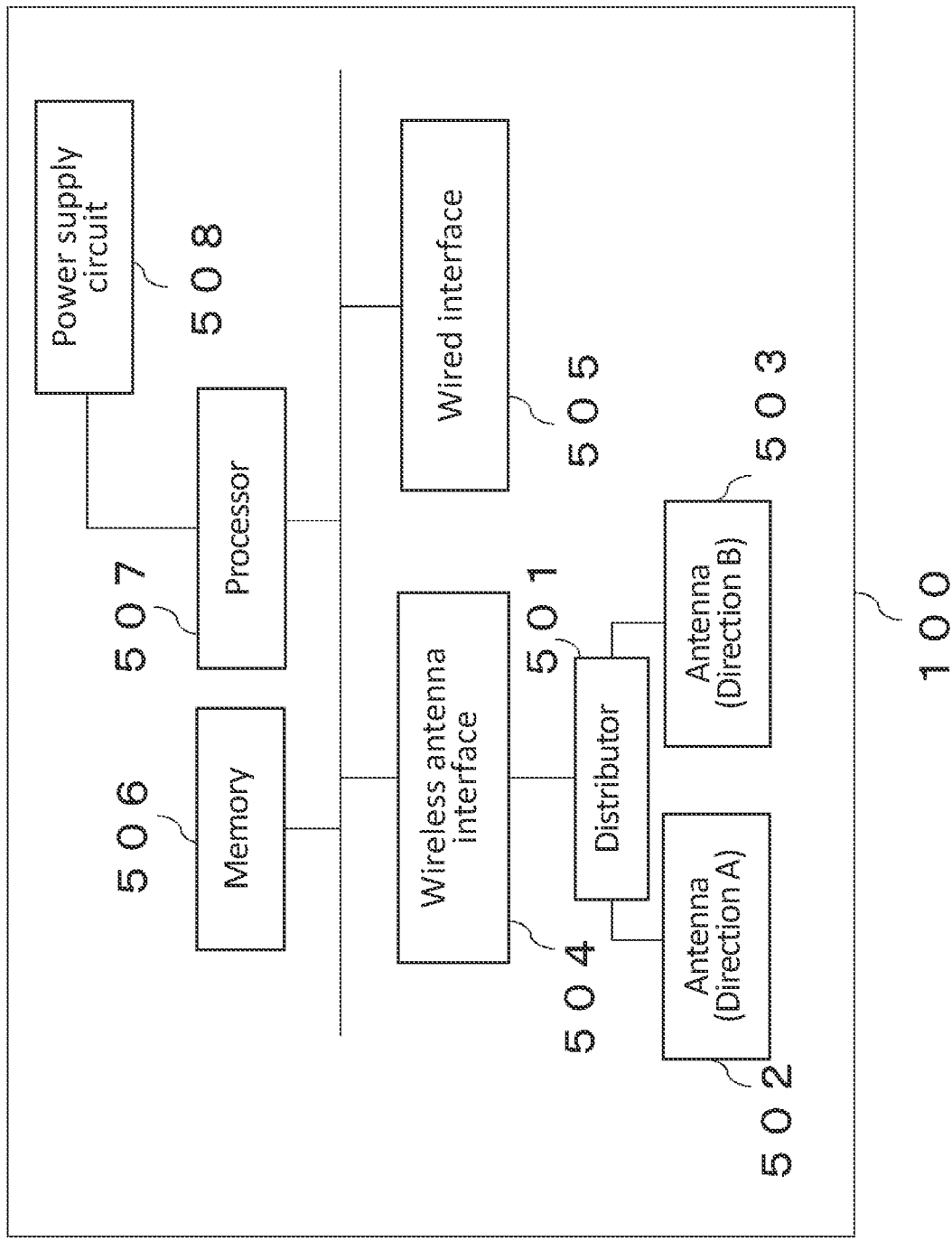
FIG. 6 is a hardware configuration of the ground wireless device 100 according to Embodiment 1.

FIG. 6 shows a hardware configuration of the ground wireless device 100. The ground wireless device 100 includes: a wireless antenna interface 504 which connects an antenna 502 in Direction A and an antenna 503 in Direction B by a divider 501; a wired interface 505; a memory 506; a processor 507; and a power supply circuit 508. The memory 506 stores a program of the wireless communication unit (between ground and train) 101, the wired connection unit 102, the wireless control unit 103, the wired control unit 104, and the wireless resource management unit 105; the processor 507 reads out the program from the memory 506 to execute the program. The information transmitted from the wireless communication unit (between ground and train) 101 and addressed to the on-board wireless device 200 is that transmitted in Direction A and Direction B via the wireless antenna interface 504 and the divider 501, regardless of the location of the on-board wireless device 200. Similarly, in the case of reception, the information received from Direction A and the information received from Direction B are mixed and inputted to the wireless communication unit (between ground and train) 101. The information transmitted from the wireless relay device 400 to the ground wireless device 100 is received by the wired interface 505. The ground wireless devices 110 to 140 also have the same hardware configuration as the ground wireless device 100.

Figure 7:
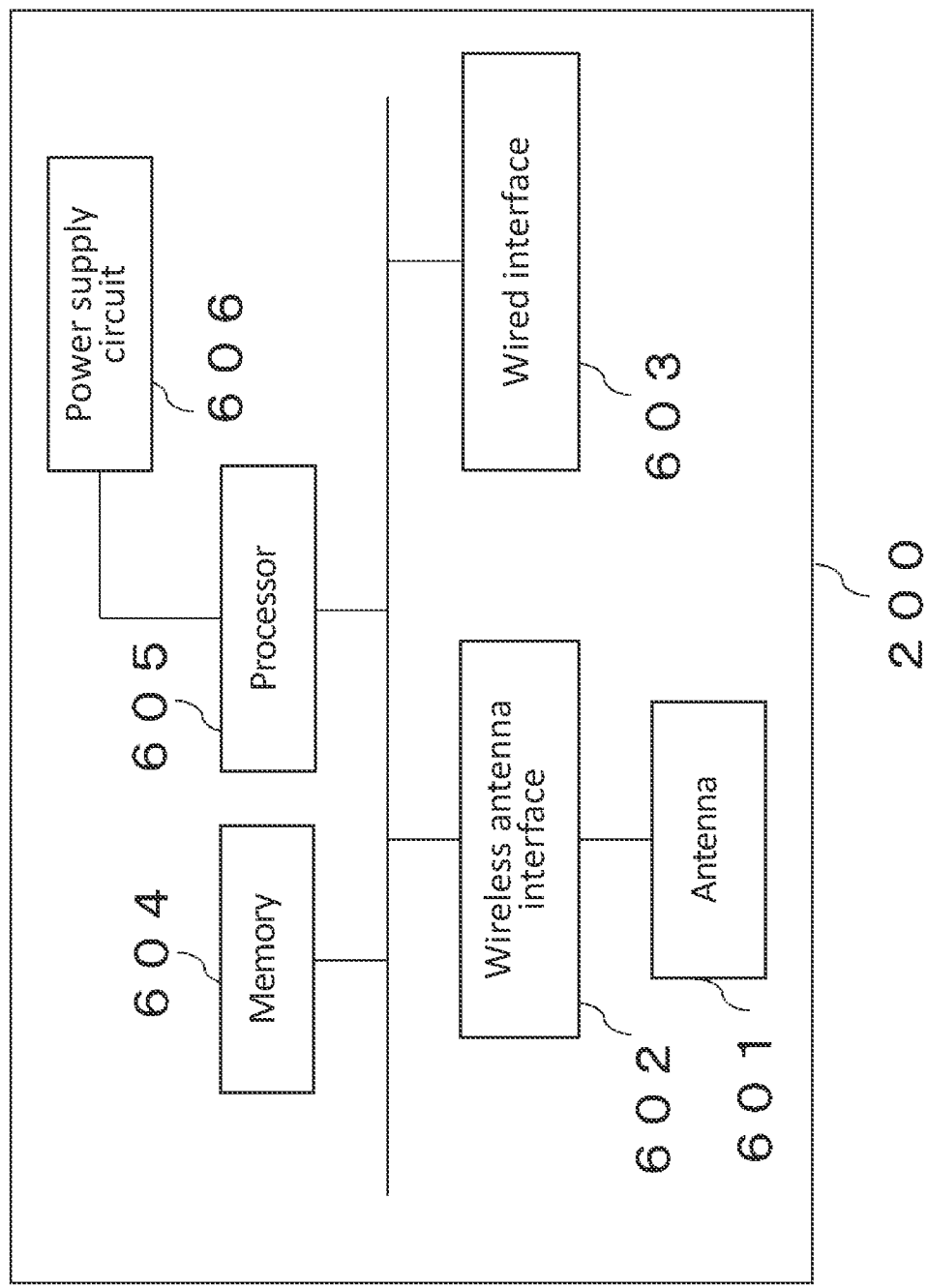
FIG. 7 is a hardware configuration of the on-board wireless device 200 according to Embodiment 1.

FIG. 7 shows a hardware configuration of the on-board wireless device 200. The on-board wireless device 200 includes: an antenna 601; a wireless antenna interface 602; a wired interface 603; a memory 604; a processor 605; and a power supply circuit 606. The memory 604 stores a program of the wireless communication unit (between ground and train) 201, the wireless control unit 202, the wired connection unit 203, and the wired control unit 204; the processor 605 reads out the program from the memory 604 to execute the program. The on-board wireless device 200 communicates with the ground wireless device 100 via the wireless antenna interface 602 and the antenna 601. The wired interface 603 is an interface to communication equipment on the train. The on-board wireless device 210 has the same hardware configuration as the on-board wireless device 200.

Figure 8:
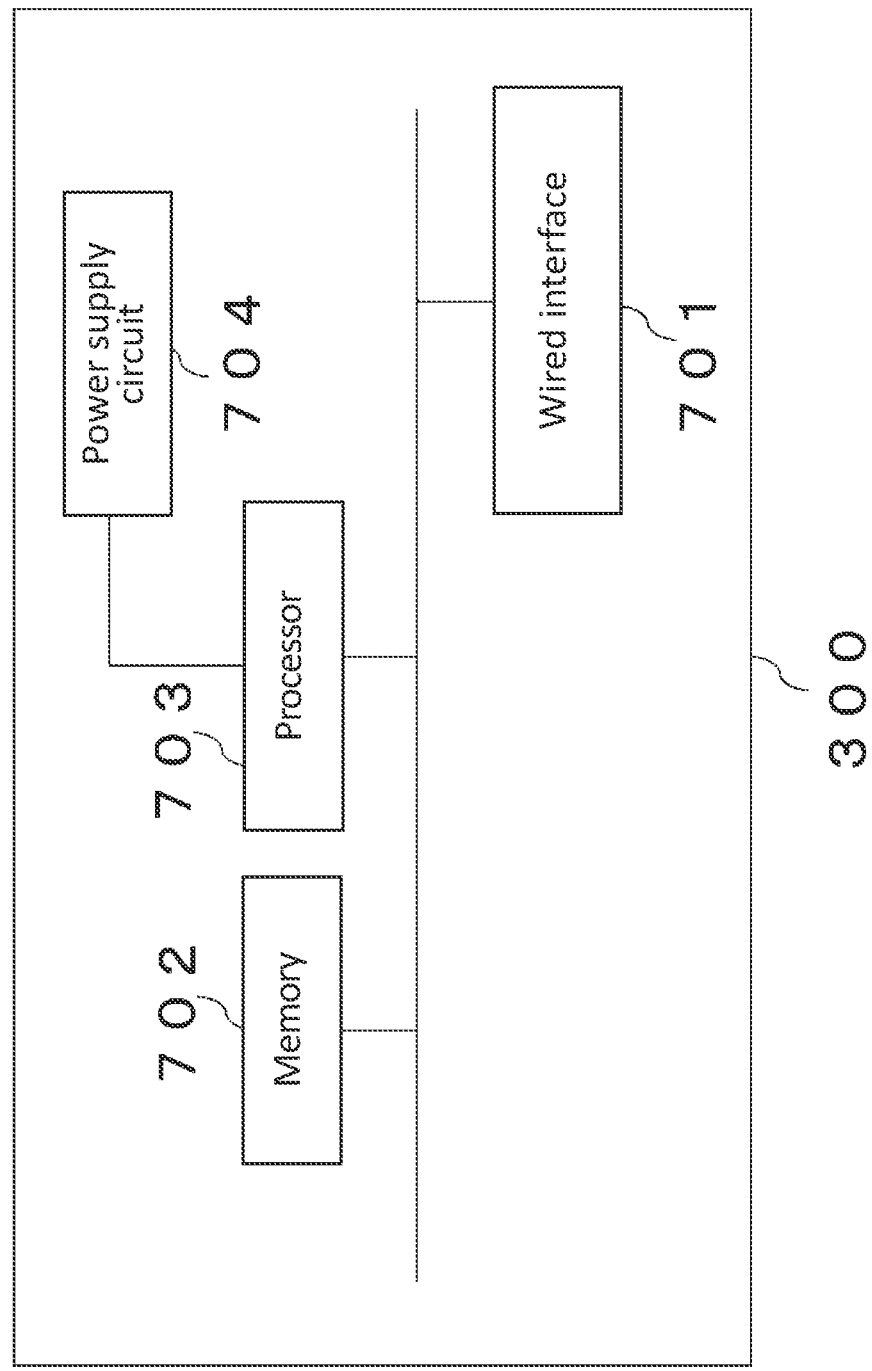
FIG. 8 is a hardware configuration of the wireless control device 300 according to Embodiment 1.

FIG. 8 shows a hardware configuration of the wireless control device 300. The wireless control device 300 includes: a wired interface 701; a memory 702; a processor 703; and a power supply circuit 704. The memory 702 stores a program of the wired connection unit 301, the wired control unit 302, the on-board wireless device management unit 303, the destination wireless device determination unit 304, and the data of the database unit 305; the processor 703 reads out the program from the memory 702 to execute the program. The wireless control device 300 communicates with the wireless relay device 400 via the wired interface 701.

Figure 9:
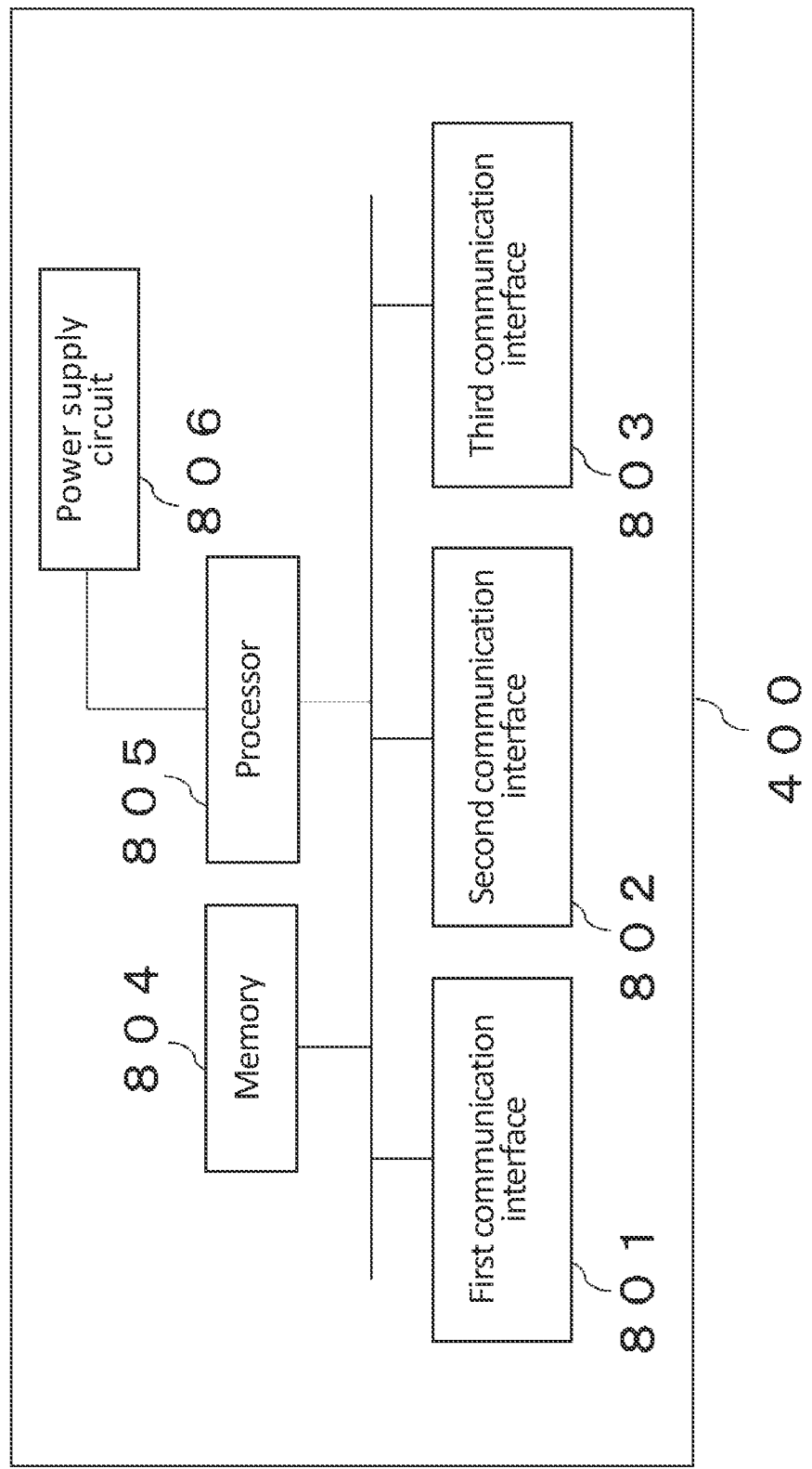
FIG. 9 is a hardware configuration of the wireless relay device 400 according to Embodiment 1.

FIG. 9 shows a hardware configuration of the wireless relay device 400. The wireless relay device includes: a first communication interface 801; a second communication interface 802; a third communication interface 803; a memory 804; a processor 805; and a power supply circuit 806. The first communication interface 801, the second communication interface 802, and the third communication interface 803 correspond to the hardware of the first communication interface unit 401, the second communication interface unit 402, and the third communication interface unit 403, respectively. The memory 804 stores a program of the information classification unit 405 and the message generation unit 406; the processor 805 reads out the program from the memory 804 to execute the program.

FIG. 10 shows an example of the communication path table set in the database unit 305 of the wireless control device 300. FIG. 11 shows an example of the communication reservation table set in the database unit 305 of the wireless control device 300. Next, the operation of the wireless control device 300 for duplicating and transmitting the train control information will be described. In the wireless control device 300 shown in FIG. 4, when an information generation unit (not shown) generates the train control information addressed to the on-board wireless devices 200 and 210 installed on the respective trains, the on-board wireless device management unit 303 refers to the communication path table set in the database unit 305, and using an on-board wireless device ID of the destination train that is contained in the train control information, selects an ID of a ground wireless device that is currently connected to the train, from among the ground wireless devices 100 to 140. According to FIG. 10, the ground wireless device 100 is selected for the on-board wireless device 200.

Also, the destination wireless device determination unit 304 refers to the communication reservation table set in the database unit 305, and using the ID of the ground wireless device, selects a coverage area for which a wireless resource should be reserved for the train. According to FIG. 11, the ground wireless devices 110 and 120 are selected for the ground wireless device 100.

As a result, for the on-board wireless device 200, the ground wireless devices 100, 110, and 120 are selected, and the data transfer messages (M200-100, M200-110, M200-120) for transmitting the train control information to each of them are transmitted from the wired connection unit 301 via the wired control unit 302. Similarly, for the on-board wireless device 210, the on-board wireless devices 120, 130, and 140 are selected, and the data transfer messages (M210-120, M210-130, M210-140) are transmitted to each of them.

Figure 12:
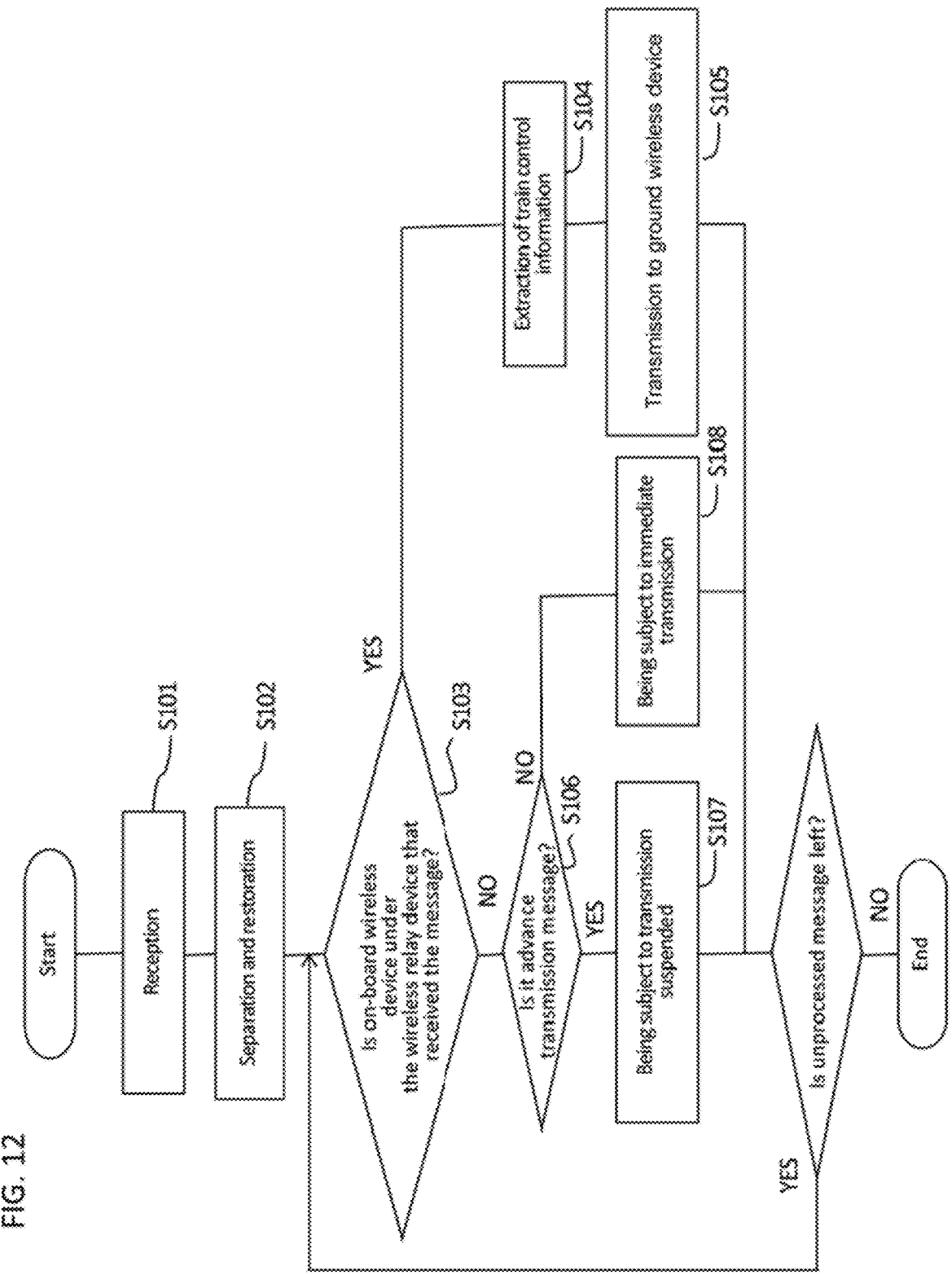
FIG. 12 is a flowchart of the wireless relay device according to Embodiment 1 at receiving operation.
Figure 13:
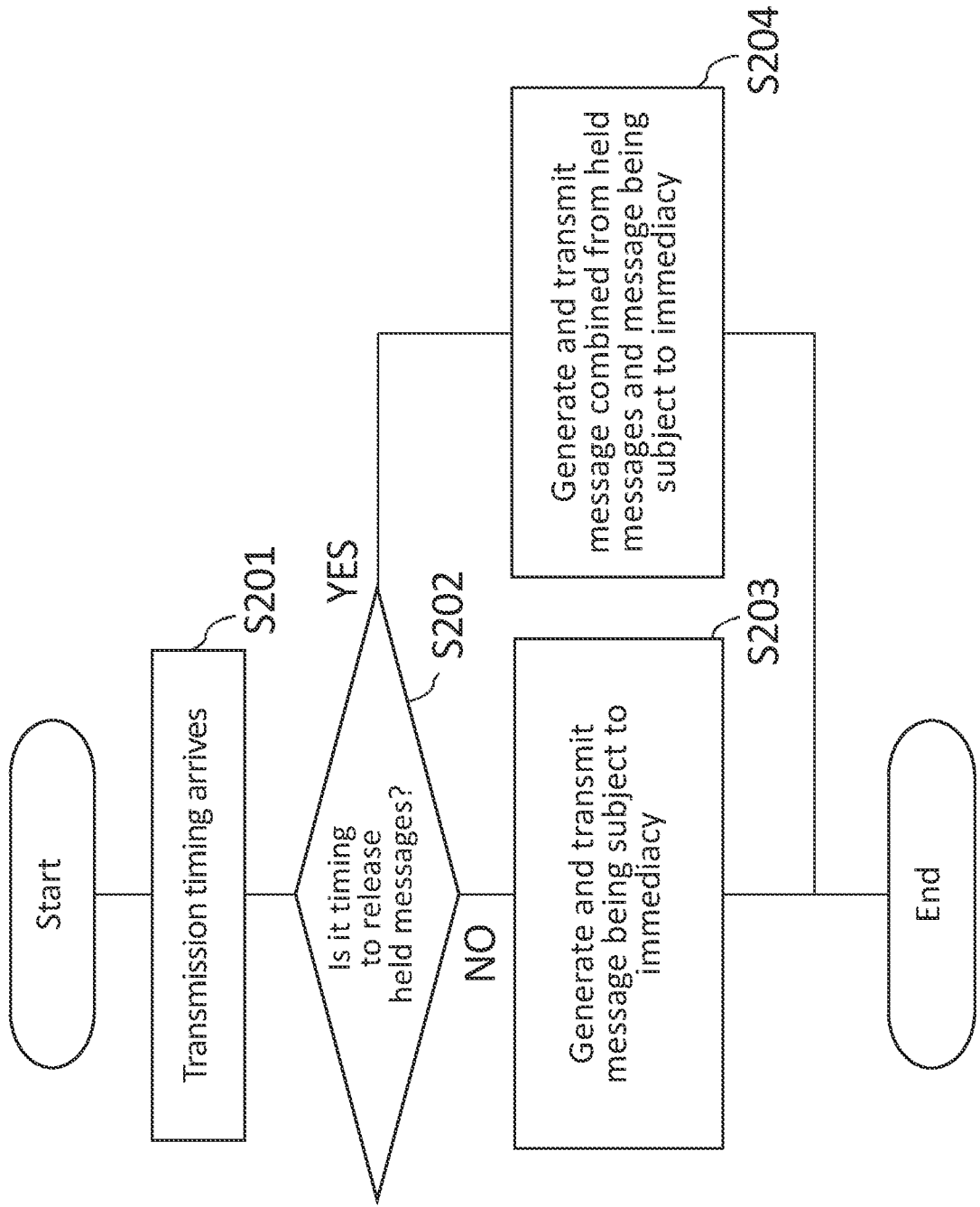
FIG. 13 is a flowchart of the wireless relay device according to Embodiment 1 at transmitting operation.

Next, the operation of the wireless relay device 400 will be described referring to FIGS. 12 and 13. In the case of receiving the data transfer message M200-100 in the first communication interface unit 401 (S101), the wireless relay device 400 extracts the train control information contained in the message (S102) in the information classification unit 405 and determines whether the on-board wireless device 200 is connected to the ground wireless device 100 under the control of the wireless relay device 400 (S103). If the on-board wireless device 200 is connected under the control of the wireless relay device 400 (S103:YES), the information classification unit 405 divides the data transfer message M200-100, extracts the train control information from the data transfer message M200-100 (S104) and classifies the extracted information as the control information to the ground wireless device 100. The message generation unit 406 generates one message from the extracted information and starts the transfer of the generated message from the second communication interface unit 402 to the ground wireless device 100 (S105). Note that the train control information extracted in S104 is first control information which requires immediacy and the message generation unit 406 generates one message from the first control information contained in one piece of the train control information.

In contrast, when the data transfer messages M200-110 and M200-120 are received, the information classification unit 405 of the wireless relay device 400 determines that the on-board wireless device 200 is not connected under the control of the wireless relay device 400 and that the received messages are advance transmission messages generated by referring to the communication reservation table (S106: YES), and then the information classification unit 405 divides the data transfer messages M200-110 and M200-120, extracts the train control information from the data transfer messages M200-110 and M200-120, and classifies the extracted train control information as the control information to be transmitted in advance to the ground wireless devices 110 and 120. The advance transmission control information is not started to be transferred immediately but is held by the message generation unit 406 of the wireless relay device (S107). Note that the train control information extracted here is second control information which does not require immediacy.

In the same way, when the wireless relay device 400 receives the data transfer message M210-120, the information classification unit 405 determines that the message is addressed to the ground wireless device 120 currently connected to the on-board wireless device 210 that is not connected under the control of the wireless relay device 400 (S106: NO), and then divides the data transfer message M210-120 to extract the train control information from the data transfer message M210-120, and classifies the extracted information as the control information to the ground wireless device 120. The extracted information is combined by the message generation unit 406, and the transfer from the third communication interface unit 403 to the wireless relay device 410 is started (S108). These processes are repeated until the unprocessed data transfer message does not remain. Note that the train control information extracted here is the first control information which requires immediacy and the message generation unit 406 generates one message from the first control information contained in one piece of the train control information.

When the wireless relay device 400 receives data transfer messages M210-130 and M210-140, the information classification unit 405 determines that the on-board wireless device 210 is not connected under the control of the wireless relay device 400 (S103: NO) and that the received messages are the advance transmission message generated by referring to the communication reservation table (S106: YES), extracts the train control information from the data transfer messages M210-130 and M210-140, and classifies the extracted information as the control information to be transferred in advance to the ground wireless devices 130 and 140. The advance transmission message is not started to be transmitted immediately but is held by the message generation unit 406 of the wireless relay device (S107). Note that the train control information extracted here is the second control information which does not require immediacy.

Next, when the transmission timing between the wireless relay devices arrives in the wireless relay device 400 (S201), the message generation unit 406 determines whether the transmission timing agrees with the predetermined timing to release the held messages (S202). When it is the timing to release the held messages (S202: YES), the message generation unit 406 of the wireless relay device 400 combines the held data transfer messages M200-110, M200-120, M210-130, and M210-140 and the messages which require immediacy into one data transfer message M400 to transfer it from the third communication interface unit 403 to the next wireless relay device 410 (S204). When it is not the timing to release the held messages (S202: NO), the message generation unit 406 of the wireless relay device 400 generates a data transfer message from the messages which require immediacy and transfers it from the third communication interface unit 403 to the next wireless relay device 410 (S203). That is, when it is the timing to release the held messages, the message generation unit 406 generates one message from a plurality of pieces of the second control information contained in a plurality of pieces of the train control information, and the message is transmitted from the third communication interface unit 403 being a transmission unit. When it is not the timing to release the held messages, the message generation unit 406 generates one message from the first control information which requires immediacy contained in a piece of the train control information, and the message is transmitted from the third communication interface unit 403 being the transmission unit.

Next, the operation when the wireless relay device 410 receives the data transfer message M210-120 will be described. When receiving the data transfer message M210-120 from the first communication interface unit 401, the wireless relay device 410 determines that the on-board wireless device 210 is not connected to the ground wireless device 110 under the control of the wireless relay device 410 in the information classification unit 405 and that the message is addressed to the ground wireless device 120 which is currently in communication, and starts the transfer of the message to the wireless relay device 420 using the third communication interface unit 403.

When the wireless relay device 410 receives the data transfer message M400 in which the data transfer messages M200-110, M200-120, M210-130, and M210-140 are combined, the combined message is firstly divided in the information classification unit 405. Next, the wireless relay device 410 determines whether they are addressed to the ground wireless device 110 under the control the wireless relay device 410 for each of the divided data transfer messages. When the data transfer message M200-110 is determined to be addressed to the ground wireless device 110, the wireless relay device 410 starts the transfer of the data transfer message M200-110 to the ground wireless device 110 using the second communication interface unit 402 being the transmission unit. On the other hand, with respect to the data transfer messages M200-120, M210-130, and M210-140, the information classification unit 405 determines that the on-board wireless devices are not connected to the ground wireless device 110 under the control of the wireless relay device 410 and then determines that these data transfer messages are the advance transmission messages generated by referring to the communication reservation table. The advance transmission messages are not transferred immediately but held in the message generation unit 406 of the wireless relay device. When the next transmission timing between the wireless relay devices arrives, the message generation unit 406 combines the held data transfer messages into one data transfer message M410 and transfers the combined message from the third communication interface unit 403 to the next wireless relay device 420. That is, the information classification unit 405 extracts from the received message the train control information addressed to a ground wireless device connected to another wireless relay device, the message generation unit 406 generates one message from a plurality of pieces of the train control information extracted by the information classification unit 405, and the second communication interface unit 402 being a transmission unit transmits the one generated message to the adjacent wireless relay device.

The operation of the wireless relay device 420 when the data transfer message is received will be described. In the case where the wireless relay device 420 receives the data transfer message M210-120 from the first communication interface unit, the wireless relay device 420 determines that the on-board wireless device 210 is connected to the ground wireless device 120 under the control of the wireless relay device 420, extracts the train control information from the received data transfer message, and starts the transfer of the train control information to the ground wireless device 120 using the second communication interface unit 402.

Further, when the wireless relay device 420 receives a data transfer message in which the data transfer messages M200-120, M210-130, and M210-140 are combined, the wireless relay device 420 firstly divides the combined message. Next, the wireless relay device 420 determines whether they are addressed to the ground wireless device 120 under the control of the relay device 420 for each of the divided data transfer messages.

When the data transfer message M200-120 is determined to be addressed to the ground wireless device 120, the transfer of the data transfer message M200-120 to the ground wireless device 120 from the second communication interface unit 402 is started. On the other hand, with respect to the data transfer messages M210-130 and M210-140, the wireless relay device 420 determines that the on-board wireless device is not connected to the ground wireless device 120 under the control of the wireless relay device 420 and then determines that the data transfer messages are the advance transmission messages generated by referring to the communication reservation table. The advance transmission messages are not transferred immediately but held in the wireless relay device. When the next transmission timing between wireless relay devices arrives and it is the timing to release the held messages, the held data transfer messages are combined with the other held data transfer messages into one data transfer message M420 and transferred from the third communication interface unit 403 to the next wireless relay device 430.

Next, the operation when the wireless relay device 430 receives the data transfer message M420 will be described. When receiving, in the first communication interface unit, the data transfer message M420 in which the data transfer message M210-130 and M210-140 are combined, the wireless relay device 430 firstly divides the combined message. Next, for each of the divided data transfer messages, it is determined whether they are addressed to the ground wireless device 130 under the control of the wireless relay device 430.

When it is determined that the data transfer message M210-130 is addressed to the ground wireless device 130, the transfer of the data transfer message M210-130 to the ground wireless device 130 is started using the second communication interface unit 402. On the other hand, with respect to the data transfer message M210-140, the wireless relay device 430 detects that the on-board wireless device is not connected to the ground wireless device 130 under the control of the wireless relay device 430 and then determines that the data transfer message M210-140 is the advance transmission message generated by referring to the communication reservation table. The advance transmission message is not transferred immediately but held in the wireless relay device. When the next timing for transmission between wireless relay devices arrives and the held messages are allowed to be released, the held data transfer message is combined with the other held data transfer messages into one data transfer message M430 and transferred from the third communication interface unit 403 to the next wireless relay device 440.

Next, the operation when the wireless relay device 440 receives the data transfer message M430 will be described. When receiving the data transfer message M430 from the first communication interface unit, the wireless relay device 440 firstly divides the combined message. Next, when it is determined that the divided data transfer message M210-140 is addressed to the ground wireless device 140 under the control of the wireless relay device 430, the transfer of the data transfer message M210-140 to the ground wireless device 140 is started from the second communication interface unit 402.

Next, the flow of the train control information transmitted from the on-board wireless device 200 to the wireless control device 300 will be described. When receiving the train control information from the on-board wireless device 200, the ground wireless device 100 transmits the received train control information to the wireless relay device 400. The wireless relay device 400 starts the transfer of the received train control information as the data transfer message M200-300 to the next wireless relay device 410 using the third communication interface unit 403.

When receiving the data transfer message M200-300 in the first communication interface unit 401, the wireless relay device 410 determines that the received message is not addressed to the ground wireless device 110 under the control of the wireless relay device 420 and starts the transfer of the received message to the wireless relay device 420. Subsequent transfer continues in the same way.

To summarize the above, the wireless relay device 400 starts, at the next transmission timing, the transfer of a data transfer message containing the train control information which the on-board wireless device 200 should transfer to the ground wireless device 100 currently in communication therewith. On the other hand, the data transfer messages as the advance transmission messages to be transferred in advance in preparation for the movement are not started to be transferred immediately, but, when the predetermined timing to release the held messages that is set by the wireless relay device 400 arrives, the plurality of data transfer messages held so far are combined into one data transfer message and then the transfer thereof is started.

As the result, the number of the data transfer messages transferred between the wireless relay devices 400 to 440 can be reduced.

The effects obtained in the present embodiment described above are as follows. Among the data transfer messages transferred between the wireless relay devices 400 to 440, the number of the data transfer messages containing the train control information transmitted in advance can be reduced, which leads to the reduction of the number of packets transferred per second. This contributes to securing the transmission capacity for communicating other types of information between the wireless relay devices 400 to 440, resulting in a large capacity for the ground-to-train wireless communication for the transmission of general transmission information and further an increase in the manageable number of trains.

Note that the present embodiment describes a configuration in which the first communication interface unit 401 functions as a reception unit; the second communication interface unit 402 functions as the transmission unit; and the third communication interface unit 403 functions as the transmission unit.

As described above, the wireless relay device 400 according to Embodiment 1 includes: the reception unit (the first communication interface unit 401) to receive train control information; the information classification unit 405 to classify the train control information into first control information requiring immediacy and second control information not requiring immediacy; the message generation unit 406 to generate one message from the first control information contained in a piece of the train control information and to generate one message from a plurality of pieces of the second control information contained in a plurality of pieces of the train control information; and the transmission unit (the second communication interface unit 402 and the third communication interface unit 403) to transmit the message generated by the message generation unit 406. With this configuration, it is possible to reduce the number of the data transfer messages for the train control information which does not require immediacy while the instantaneous communication for the train control information which requires immediacy is maintained. Note that reduction of the number of messages leads to less frequent message transmission, which makes it easier to secure the wireless capacity. Therefore, the reduction of the number of message transmissions is important for securing the wireless capacity, not to mention the reduction of the amount of information to be transmitted.

Further, in the wireless relay device 400 according to Embodiment 1, the message generation unit is characterized in that a plurality of pieces of the second control information are held until the predetermined timing arrives and then combined to generate one message from the a plurality of pieces of the second control information. With this configuration, the second control information until the predetermined timing arrives can be combined into one message, so that the number of transmissions of the data transfer messages which does not require immediacy can be reduced.

Also, in the wireless relay device 400 according to Embodiment 1, the first control information is the control information addressed to a first ground wireless device which is installed along the railway track and with which an on-board wireless device mounted on a train is currently communicating; the second control information is the control information addressed to a second ground wireless device which is installed along the railway track and with which the on-board wireless device is to be in communication when the train moves; and the transmission unit (the second communication interface unit 402 and the third communication interface unit 403) transmits a message generated from the first control information to the first ground wireless device and a message generated from the second control information to a wireless relay device connected to the second ground wireless device. With this configuration, the control information addressed to the first ground wireless device installed along the railway track and currently in communication with the on-board wireless device mounted on the train can be transmitted immediately; and the control information addressed to the second ground wireless device which is installed along the railway track and which is to be in communication with the on-board wireless device when the train moves can be transmitted efficiently with a small number of messages.

Also, the wireless relay device 400 according to Embodiment 1 includes: the reception unit (the first communication interface unit 401) to receive a first message in which a plurality of pieces of train control information are combined; the information classification unit 405 to extract from the first message, the train control information addressed to a ground wireless device connected to another wireless relay device; the message generation unit 406 to generate one second message from a plurality of pieces of the train control information extracted by the information classification unit 405; and the transmission unit (the second communication interface unit 402 and the third communication interface unit 403) to transmit the one second message generated by the message generation unit 406 to an adjacent wireless relay device. With this configuration, the second message which needs to be transmitted to an adjacent wireless relay device is extracted from the received first message and can be transmitted, so that the wireless resources for the communication between the wireless relay devices can be efficiently used.

Also, in the wireless relay device 400 according to Embodiment 1, the information classification unit 405 extracts, from the received first message, the train control information addressed to the ground wireless device connected to the wireless relay device; the message generation unit 406 generates a single third message from the train control information addressed to the ground wireless device connected to the wireless relay device; and the transmission unit (the second communication interface unit 402 and the third communication interface unit 403) transmits the generated third message to the ground wireless device connected to the wireless relay device. With this configuration, the third message needed for the wireless relay device is extracted from the received first message and only the message needed for the ground wireless device connected to the wireless relay device can be transmitted, so that the communication between the wireless relay device and the ground wireless device can be performed efficiently.

EMBODIMENT 2

In Embodiment 1, the train control information is transmitted to the ground wireless device 100 by the wireless control device 300 without additional information. As a matter of fact, however, the information transmitted from the wireless control device 300 sometimes includes, in addition to the train control information: wireless control information for controlling the wireless link between the ground wireless device 100 and the on-board wireless device 200; ground control information for controlling the transmission between the wireless control device 300 and the ground wireless devices 100 to 140; and identification information for identifying a ground wireless device to be a relay destination (for example, internet protocol (IP) header and user datagram protocol (UDP) header). In the present embodiment, the message transmitted from the wireless control device 300 to the ground wireless devices 100 to 140 is defined as a train control message including these described above, and a method of further improving the transfer efficiency of the data transfer message transferred between the wireless relay devices by focusing on the data structure of the train control information received by the wireless relay device 400 from the wireless control device 300 will be described.

Figure 14:
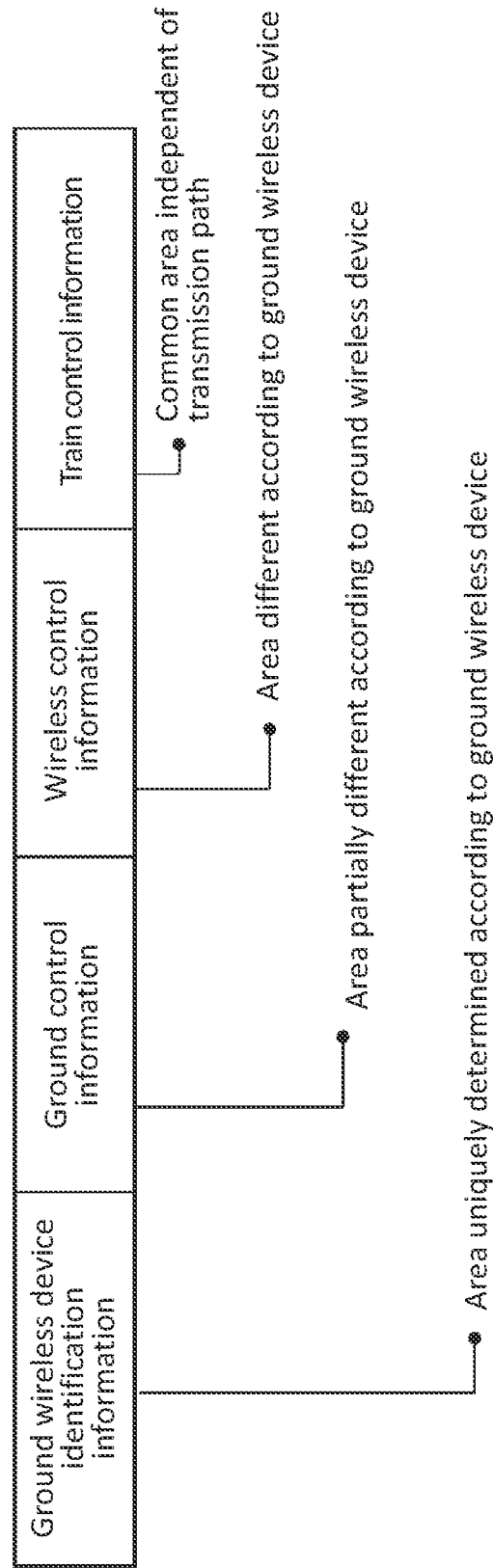
FIG. 14 is a packet structure of a train control message according to Embodiment 2.

In addition to the figures used in the description of Embodiment 1, FIG. 14 is referred as the figure necessary for the description of the present embodiment. FIG. 14 shows the packet structure of the train control message. The train control message includes: the train control information; the wireless control information for controlling the wireless link between the ground wireless device and the on-board wireless device; the ground control information for controlling the transmission between the wireless control device and the ground wireless devices; and the identification information for identifying the ground wireless device to be the relay destination (for example, IP header and UDP header).

Even when the wireless control device 300 duplicates the train control information for each of the destination ground wireless devices, the wireless control information, the ground control information, and the ground wireless device identification information may sometimes have to be different for each of the destination ground wireless devices. Therefore, in the present embodiment, these pieces of information are classified into an area that is uniquely determined in accordance with the ground wireless devices, an area that is partially different, and an area that is common regardless of the destination and the transmission path, and redundant information is deleted to further reduce the size of the data transfer message after combining a plurality of messages, or to combine more messages.

Figure 15:
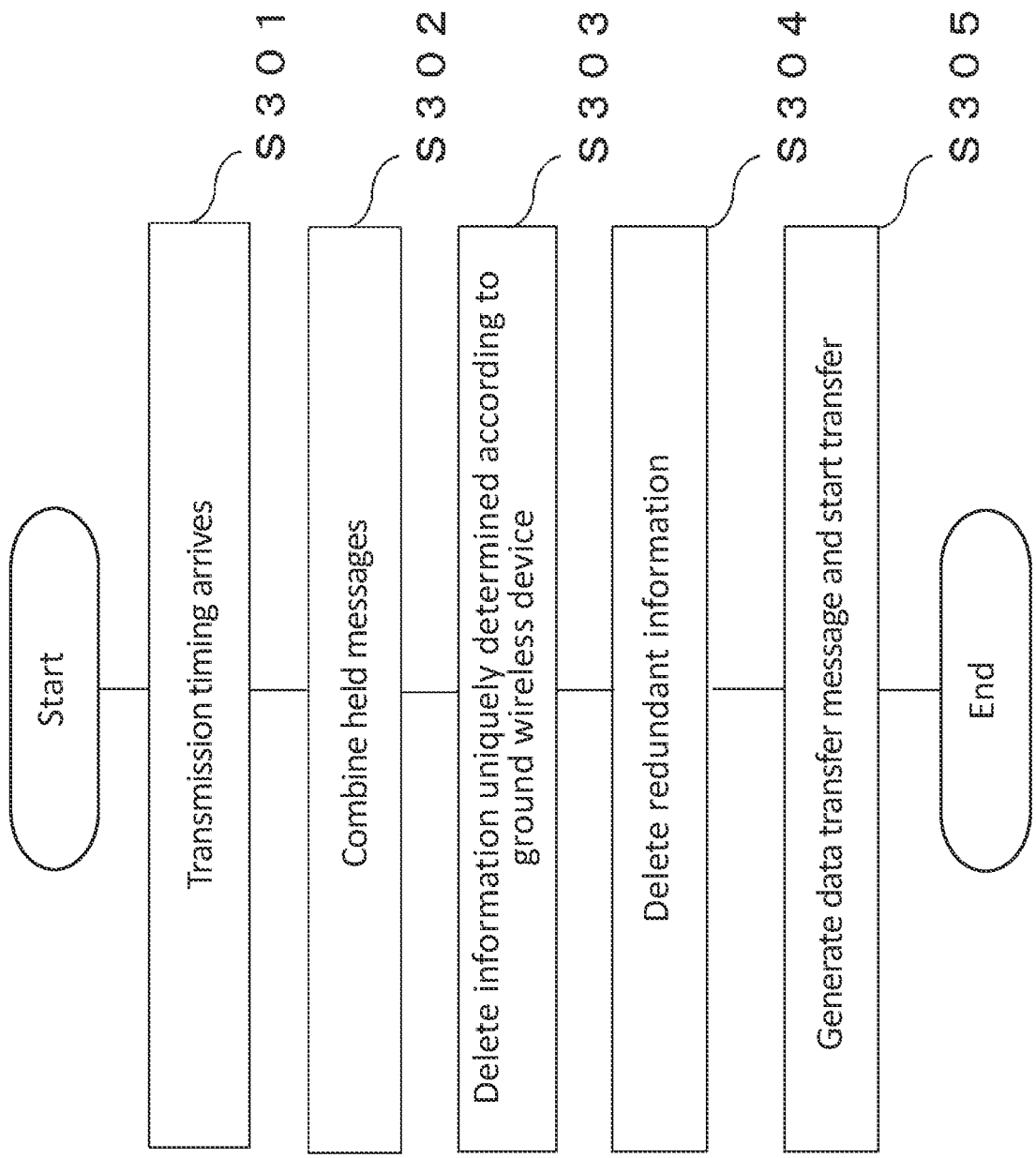
FIG. 15 is a flowchart of a wireless relay device according to Embodiment 2 at transmitting operation.

As in Embodiment 1, the operation of the wireless relay device 400 to transmit the data transfer messages will be described referring to FIG. 15. In the description of the present embodiment, the difference from Embodiment 1 will be mainly described. When the predetermined transmission timing between the wireless relay devices arrives (S301), the wireless relay device 400 combines the data transfer messages M200-110, M200-120, M210-130, and M210-140 that have been held (S302). At this time, the ground wireless device identification information uniquely determined in accordance with the ground wireless devices 100 to 140 is deleted. With respect to the ground control information different only in part in accordance with the ground wireless devices 100 to 140, only the different information is left and the uniquely determined information is deleted (S303). With respect to the common information regardless of the ground wireless devices, only one piece of information is left in the combined data transfer message and the redundant information is deleted (S304). Note that the information to be deleted here is held commonly by all the wireless relay devices in advance. Accordingly, the information after the deletion is constructed as the data transfer message M400B, and the transfer is started to the wireless relay device 410 (S305).

Next, the operation of the wireless relay device 410 at the time of receiving the data transfer message M400B will be described. When receiving the data transfer message M400B into which the data transfer messages M200-110. M200-120, M210-130, and M210-140 are combined, the wireless relay device 410 first restores and divides the data transfer message M400B. The information deleted at the time of combining is restored on the basis of the information held in common.

Since the subsequent processing is the same as that in Embodiment 1, the description thereof is omitted. The transmission performed by the wireless relay device 410 and the operations of the wireless relay device 420 and the subsequent wireless relay devices are the same as the operations performed by the wireless relay device 400 at the time of combining the messages and performed by the wireless relay device 410 at the time of receiving the combined message and thus the description thereof is omitted.

The effects obtained in the present embodiment described above are the same as those described in Embodiment 1.

As described above, the message generation unit 406 in the wireless relay device 400 according to Embodiment 2 is characterized in that it deletes the control information that is uniquely determined according to the ground wireless devices designated by the addresses that are contained in the second control information when generating one message from a plurality of pieces of the second control information. With this configuration, the amount of data of the messages to be transferred can be reduced, which leads to efficient utilization of wireless resources used between the wireless relay devices 400 to 440.

Also, the message generation unit 406 in the wireless relay device 400 according to Embodiment 2 is characterized in that it deletes the common control information that is independent of the ground wireless devices designated by the addresses that are contained in a plurality of pieces of the second control information when generating one message from a plurality of pieces of the second control information. With this configuration, the amount of data of the messages to be transferred can be reduced, which leads to efficient utilization of wireless resources used between the wireless relay devices 400 to 440.

Also, the information classification unit 405 in the wireless relay device 410 according to Embodiment 2 is characterized in that it restores the control information which can be uniquely determined according to the destination ground wireless devices when extracting the train control information addressed to the ground wireless devices connected to the other wireless relay devices. With this configuration, the control information deleted in the wireless relay device 400 can be restored by the wireless relay device 410 without losing the necessary control information, which leads to efficient utilization of the wireless resources used between the wireless relay devices 400 to 440.

Also, the information classification unit 405 in the wireless relay device 410 according to Embodiment 2 is characterized in that it restores the control information which can be uniquely determined according to the destination ground wireless device when extracting the train control information addressed to the ground wireless device connected to the wireless relay device. With this configuration, the control information deleted in the wireless relay device 400 can be restored by the wireless relay device 410 without losing the necessary control information, which leads to efficient utilization of the wireless resources available between the wireless relay devices 400 to 440.

EMBODIMENT 3

In the present embodiment, a method of determining a hold time of the wireless relay device will be described. In Embodiment 1 and Embodiment 2, the hold time for messages to be combined and transferred is determined in advance for each of the wireless relay devices. Therefore, there is a possibility that the transfer delay increases as the number of times of relaying until reaching the destination ground wireless device increases. In the present embodiment, the hold time for the messages in the wireless relay devices is changed for each of the destination wireless relay devices.

In addition to the figures used in the description of Embodiment 1, FIG. 16 is referred as the figure necessary for the description of the present embodiment. FIG. 16 shows a transmission timing setting table set for the wireless relay device 400. As in Embodiment 1, an operation of the wireless relay device 400 to transmit the data transfer messages will be described. In the present embodiment, the difference from Embodiment 1 will be mainly described.

When receiving the data transfer messages M210-130 and M210-140 from the first communication interface unit 401, the wireless relay device 400 determines that the on-board wireless device 210 is not connected under the control of the wireless relay device 400 and that these messages are advance transmission messages generated by referring to the communication reservation table. The advance transmission messages are not transferred immediately but held in the wireless relay device. Note that train control information contained in the held messages is the second control information which does not require immediacy.

When the timing for transmission between the wireless relay devices arrives, the wireless relay device 400 refers to FIG. 16 and extracts destination wireless relay devices for which the transfer of the messages should be started at the current transmission timing (time slot). In the time slot 0, the data addressed to the wireless relay devices 410 to 440 is transferred. In the time slot 2 and the time slot 4, the data transfer messages addressed to the wireless relay device 440 and the wireless relay device 430 that is the second farthest relay device are transmitted. In the time slot 3, the data transfer messages addressed to the wireless relay device 440 and the wireless relay device 420 are transmitted.

As described above, the transmission opportunity for each wireless relay device in one transmission period is given once for the wireless relay device 410, twice for the wireless relay device 420, three times for the wireless relay device 430, and four times for the wireless relay device 440, and more transmission opportunities are set for wireless relay devices addressed farther from the wireless relay device 400. In addition to the effects described in Embodiment 1, the effects obtained in the present embodiment described above is such that the transmission delay increased by the number of transfers can be suppressed by increasing the number of transfers to distant destinations.

The configurations shown in Embodiment 1 to Embodiment 3 are examples of the implementation of the present disclosure. The present disclosure can be combined with other known techniques, and a part of the configuration can be omitted or changed without departing from the gist of the present disclosure.

As described above, the wireless relay device 400 according to Embodiment 3 is characterized in that the time period for which the second control information not requiring immediacy is held differs depending on the number of times the second control information is to be wirelessly relayed. With this configuration, the number of the transfers to the distant destination wireless relay devices is increased, so that the transmission delay that increases with the number of transfers can be suppressed.

DESCRIPTION OF REFERENCE NUMERALS AND SIGNS

100, 110, 120, 130, 140: ground wireless device, 101: wireless communication unit (between ground and train), 102: the wired connection unit, 200, 210: on-board wireless device, 201: wireless communication unit (between ground and train), 202: wireless control unit, 203: wired connection unit, 204: wired control unit, 205: wireless resource management unit, 300: wireless control device, 301: wired connection unit, 302: wired control unit, 303: on-board wireless device management unit, 304: destination wireless device determination unit, 305: database unit 305, 400: wireless relay device, 401: first communication interface unit, 402: second communication interface unit, 403: third communication interface unit, 404: packet analysis unit, 405: information classification unit, 406: message generation unit, 501: divider, 502: antenna, 503: antenna, 504: wireless antenna interface, 505: wired interface, 506: memory, 507: processor, 508: power supply circuit, 601: antenna, 602: wireless antenna interface, 603: wired interface, 604: memory, 605: processor, 606: power supply circuit, 701: wired interface, 702: memory, 703: processor, 704: power supply circuit, 801: first communication interface, 802: second communication interface, 803: third communication interface, 804: memory, 805: processor, 806: power supply circuit

The invention claimed is:

1. A wireless relay device comprising:
a receiver to receive train control information;
information classification circuitry to classify the train control information into first control information requiring immediacy and second control information not requiring immediacy;
message generation circuitry to generate one message from the first control information contained in a piece of the train control information and to generate one message from a plurality of pieces of the second control information contained in a plurality of pieces of the train control information; and
a transmitter to transmit messages generated by the message generation circuitry, wherein
the first control information is control information addressed to a first ground wireless device which is installed along a railway track and with which an on-board wireless device provided on a train is in communication;
the second control information is control information addressed to a second ground wireless device installed along the railway track and with which the on-board wireless device is to be in communication when the train moves; and
the transmitter transmits a message generated from the first control information to the first ground wireless device and a message generated from the second control information to a wireless relay device connected to the second ground wireless device.

2. The wireless relay device according to claim 1, wherein the message generation circuitry generates one message from the plurality of pieces of the second control information by combining the plurality of pieces of the second control information after holding the plurality of pieces of the second control information until a predetermined timing.

3. The wireless relay device according to claim 2, wherein a time period of the holding of the second control information differs depending on the number of times the second control information is to be wirelessly relayed to other wireless relay devices.

4. The wireless relay device according to claim 3, wherein the message generation circuitry deletes control information uniquely determined according to a ground wireless device designated by an address that is contained in the second control information when generating one message from a plurality of pieces of the second control information.

5. The wireless relay device according to claim 2, wherein the message generation circuitry deletes control information uniquely determined according to a ground wireless device designated by an address that is contained in the second control information when generating one message from a plurality of pieces of the second control information.

6. The wireless relay device according to claim 2, wherein the message generation circuitry deletes common control information independent of a ground wireless device designated by an address that is contained in a plurality of pieces of the second control information when generating one message from a plurality of pieces of the second control information.

7. The wireless relay device according to claim 1, wherein the message generation circuitry deletes control information uniquely determined according to a ground wireless device designated by an address that is contained in the second control information when generating one message from a plurality of pieces of the second control information.

8. The wireless relay device according to claim 1, wherein the message generation circuitry deletes common control information independent of a ground wireless device designated by an address that is contained in a plurality of pieces of the second control information when generating one message from a plurality of pieces of the second control information.

9. The wireless relay device according to claim 1, wherein
the receiver receives a third message combined of a plurality of pieces of train control information;
the information classification circuitry extracts from the third message, train control information addressed to a ground wireless device connected to another wireless relay device;
the message generation circuitry generates one fourth message from a plurality of pieces of the train control information extracted by the information classification circuitry; and
the transmitter transmits the one fourth message generated by the message generation circuitry to an adjacent wireless relay device.

10. The wireless relay device according to claim 9, wherein the information classification circuitry extracts from the third message, train control information addressed to a ground wireless device connected to the wireless relay device;

the message generation circuitry generates one fifth message from the train control information addressed to the ground wireless device connected to the wireless relay device; and the transmitter transmits the generated fifth message to the ground wireless device connected to the wireless relay device.

11. Control circuitry that controls a wireless relay device wherein the control circuitry makes the wireless relay device execute:

a step of receiving train control information;

a step of classifying the train control information into first control information requiring immediacy and second control information not requiring immediacy;

a step of generating one message from the first control information contained in a piece of the train control information and generating one message from a plurality of pieces of the second control information contained in a plurality of pieces of the train control information; and a step of transmitting the messages generated in the message generating step, wherein the first control information is control information addressed to a first ground wireless device which is installed along a railway track and with which an on-board wireless device provided on a train is in communication;

the second control information is control information addressed to a second ground wireless device installed along the railway track and with which the on-board wireless device is to be in communication when the train moves; and the step of transmitting comprises transmitting a message generated from the first control information to the first ground wireless device and a message generated from the second control information to a wireless relay device connected to the second ground wireless device.

* * * * *